April 25, 1950     J. FALCONE     2,505,177

ELECTRICAL TESTING INSTRUMENT

Filed Jan. 16, 1947     2 Sheets-Sheet 1

INVENTOR.
Joseph Falcone
BY *J. Ledermann*
Attorney

April 25, 1950 J. FALCONE 2,505,177
ELECTRICAL TESTING INSTRUMENT
Filed Jan. 16, 1947 2 Sheets-Sheet 2
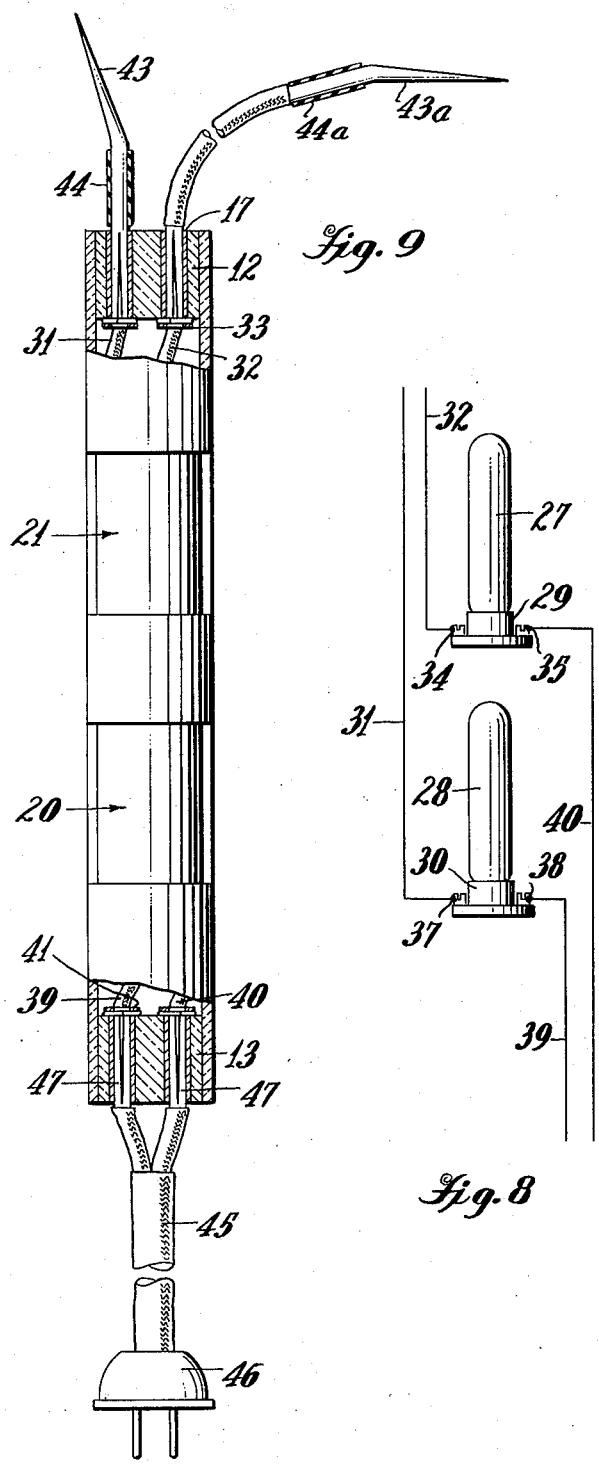
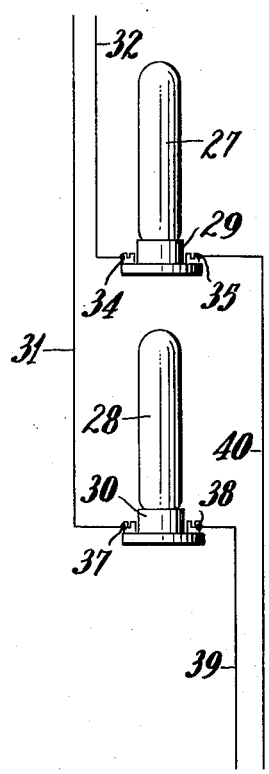
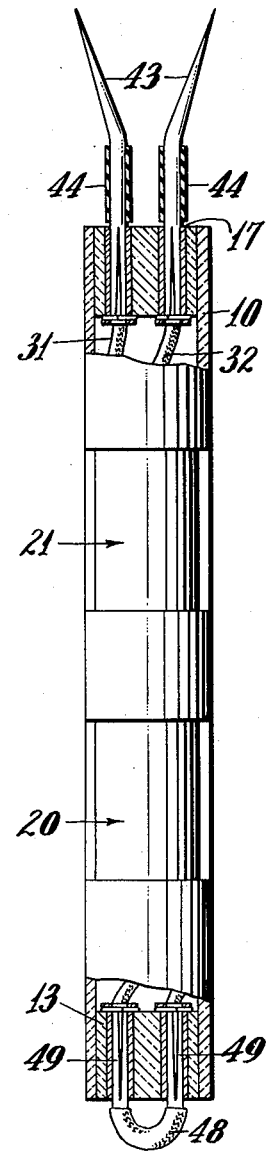
INVENTOR.
Joseph Falcone
BY F. Ledermann
Attorney Patented Apr. 25, 1950

2,505,177

UNITED STATES PATENT OFFICE 2,505,177

ELECTRICAL TESTING INSTRUMENT

Joseph Falcone, New York, N. Y.

Application January 16, 1947, Serial No. 722,324

1 Claim. (Cl. 175—183)

This invention relates to electric testing instruments, and aims to provide a novel, practical, and useful instrument for testing for short or open circuits in many varieties of electrical appliances and apparatus, of which examples may be cited such as electric toasters, electric heaters, neon lamps, etc., etc.

Another object of the invention is the provision of such a testing instrument which may be used on either of the standard 120 volt or 240 volt circuits. A feature of the instrument is that it is adapted to be plugged into a common wall outlet or socket, from which the testing current is obtained when such is required, whereby the need for a separate exciting battery is eliminated, and the entire instrument is consequently small and compact.

The above as well as additional and more detailed objects will become apparent in the following description wherein characters of reference refer to like-numbered parts in the accompanying drawings. It is to be noted that the drawings are intended for the purpose of illustration only and that it is neither desired nor intended to limit the invention to any or all of the specific details of construction shown excepting insofar as they may be deemed essential to the invention.

Referring briefly to the drawings, Fig. 1 is a side elevational view of the device, showing the aligned window openings through the cylindrical housing of the instrument.

Fig. 7 is a side elevational view of the instrument, with parts broken away and partly in section, provided with a jumper at one end and contact prongs at the other, for use in the manner to be described below.

Fig. 8 is a wiring diagram of the device.

Fig. 9 is a view similar to Fig. 7 excepting that it shows different members connected in the ends of the instrument whence the device is useful in a different manner for a different purpose.

Figure 2:
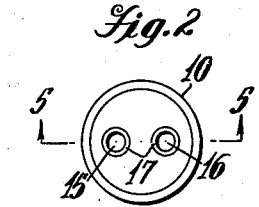
Fig. 2 is a plan view of Fig. 1.
Figure 4:
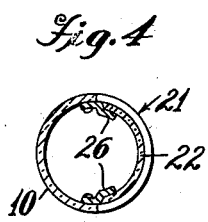
Fig. 4 is a sectional view taken on the line 4—4 of Fig. 3.

Referring in detail to the drawings, the numeral 10 indicates a cylindrical tube-like housing or wall of insulating material, having plugs 12 and 13 secured in the ends thereof by set screws 14.

The plug 12 is provided with spaced longitudinal cylindrical openings 15 and 16 therethrough, and the plug 13 is likewise provided with similar openings 18 and 19 therethrough. The walls of the openings 15, 16, 18, and 19 are lined with metal 17. Spaced curved windows 20 and 21 are cut through the wall 10, and these are provided with transparent slide doors 22, which slide on rails 26.

Secured against that side of the interior of the wall 10 which is diametrically opposite the windows 20 and 21, is a strip 23 of insulating material. Spaced L-shaped brackets 24 and 25 are secured to the strip 23, and on these brackets are mounted axially aligned lamp sockets 29 and 30, adapted to receive lamps 27 and 28, respectively. The doors 22 are slid out of the way when it is desired to change a lamp bulb.

Jumpers 31 and 32 have at one end metal caps 33 which are integral with the linings 17 of the openings 15 and 16; the other end of the jumper 31 is secured to the terminal 37 of the socket 30; the other end of the jumper 32 is secured to the terminal 34 of the socket 29. Jumpers 39 and 40 have metal caps 41 on one end which are integral with the linings 17 of the openings 18 and 19. The other end of the jumper 39 is secured to the terminal 38 of the socket 30, and the other end of the jumper 40 is secured to the terminal 35 of the socket 29. A pivoted hanger arm 42 having an eyelet in its free end, may be secured to one end of the housing 10 so that the device, as described above, may be hung from a hook or the like, not shown.

A plurality of removable metal prongs 43 and 43a, partly covered with sleeves 44 and 44a, respectively, are provided as accessories to the device, as is also a flexible cord 45 having a contact plug 46 at one end and spaced contact prongs 47 at the other end. The prongs 47, 43, and 43a are, as is obvious, insertible selectively into any one of the openings 15, 16, 18, and 19. Likewise, one or more exterior jumpers 48, having contact prong extremities 49 insertible into any of the same openings, are also provided as accessories. The lamps 27 and 28 may be of either the filament or neon type.

Figure 5:
Fig. 5 is a sectional view taken on the line 5—5 of Fig. 2.
Figure 1:
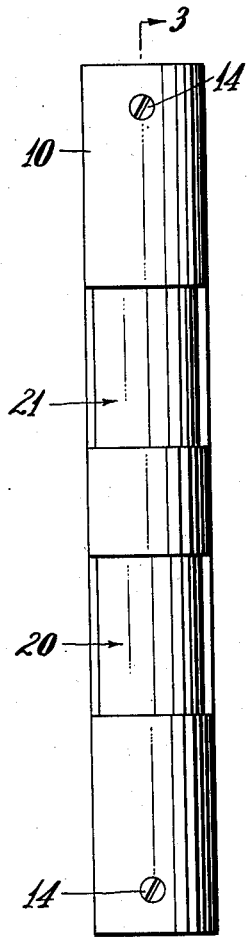
Figure 3:
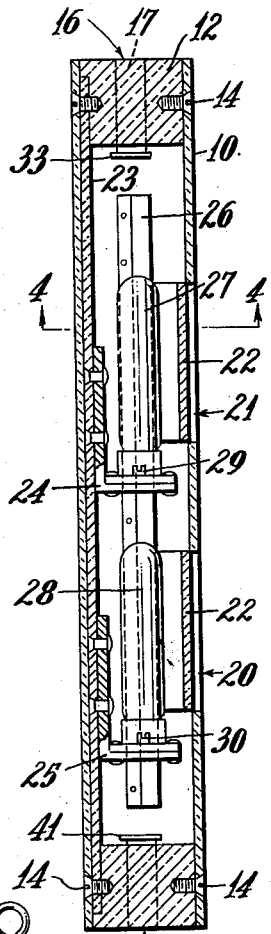
Fig. 3 is a sectional view taken on the line 3—3 of Fig. 1 with the jumper wires omitted.
Figure 6:
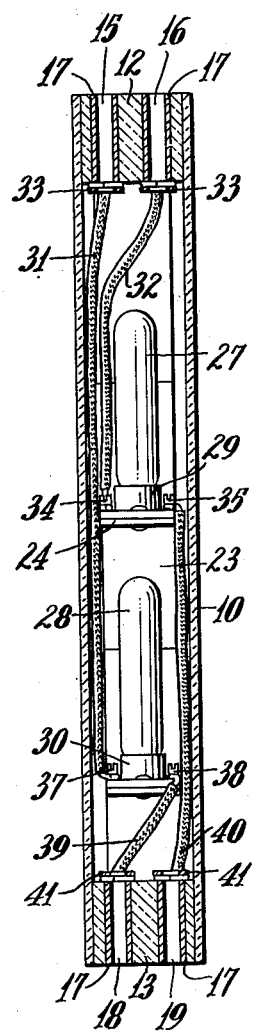
Fig. 6 is a fragmentary side elevational view of the instrument, with a hanger member added for suspending the instrument from a hook or the like, not shown.
Figure 6:
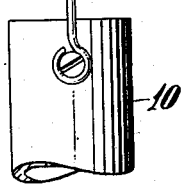

The wiring diagram of the device illustrated in Figs. 1, 3, and 5 is shown in Fig. 8. When it is desired to test for an open circuit between two points on an appliance such as, for instance, an electric toaster, the connection shown in Fig. 9 may be used, with the addition of two prongs such as 43 or 43a, or one of each, the only difference between these prongs being that the prong 43a is longer than the other for use where one or more longer prongs may be desirable. When the plug 46 is inserted into a wall outlet, the house current potential will be applied to the terminals of both lamps as well as the terminal openings 15—16 and hence the two prongs 43 in the latter. By applying the tips of the prongs between any two points of the toaster heating element, the test may be made. If the circuit between those points is closed, the lamps will both be energized, but if the circuit is open the lamps will remain unlit.

When the electrical device or circuit being tested is itself energized, then the arrangement shown in Fig. 7 is used, wherein the lower end is shorted by the jumper 48 and the upper end has the prongs 43 inserted into the openings 15—16. The prongs 43 are then applied to the various points of the device being tested, and it is apparent that, by moving one or both prongs to different points on the circuit, the lamps will light up when the circuit is complete up to the points finally contacted by the prongs.

Thus a sure and simple means has been provided for testing electrical circuits, and other combinations as well as those shown and described may be obtained by the selective use of the accessories indicated, to further enhance the usefulness of the invention.

Obviously modifications in form and structure may be made without departing from the spirit and scope of the invention.

I claim:

A device of the class described comprising a tube-like housing, the ends of said housing having plugs of non-conductive material therein, means releasably securing said plugs in said housing, each of said plugs having two longitudinal openings therethrough, said openings having metallic contacts therein, longitudinally spaced brackets secured to one side of the interior of said housing, longitudinally spaced lamp sockets mounted on said brackets and having lamps therein, said housing having spaced windows cut therethrough adjacent said lamps whereby said lamps are visible from without, leads connecting one of said sockets in series with one of said contacts and hence with the corresponding of said openings in one of said plugs and with one of said contacts and hence with the corresponding of said openings in the other of said plugs, and additional leads connecting the other of said sockets in series with the other of said contacts and hence the corresponding opening thereof in said one of said plugs with the other of said contacts and hence the corresponding of said openings in said other of said plugs, said housing having longitudinal spaced rails secured to the interior thereof on opposite sides of said windows, said housing having spaced curved transparent doors slidably mounted on said rails and extending over said windows, said openings being receptive of metallic-tipped ends of leads or jumpers to make contacts with said contacts.

JOSEPH FALCONE.

REFERENCES CITED

The following references are of record in the file of this patent:

UNITED STATES PATENTS

| Number | Name | Date |
|---|---|---|
| 1,615,788 | Feldkamp | Jan. 25, 1927 |
| 1,835,882 | Krippner | Dec. 8, 1931 |
| 1,867,901 | Walter | July 19, 1932 |
| 2,128,019 | Sleeper | Aug. 23, 1938 |
| 2,167,209 | Huskey | July 25, 1939 |
| 2,233,280 | Barnes | Feb. 25, 1941 |